United States Patent
Barratt et al.

(10) Patent No.: US 8,620,055 B2
(45) Date of Patent: Dec. 31, 2013

(54) APPARATUS AND METHOD FOR REGISTERING TWO MEDICAL IMAGES

(75) Inventors: Dean Barratt, London (GB); Yipeng Hu, London (GB)

(73) Assignee: UCL Business PLC (GB)

( * ) Notice: Subject to any disclaimer, the term of this patent is extended or adjusted under 35 U.S.C. 154(b) by 118 days.

(21) Appl. No.: 13/388,932

(22) PCT Filed: Aug. 5, 2010

(86) PCT No.: PCT/GB2010/001480
§ 371 (c)(1),
(2), (4) Date: Mar. 8, 2012

(87) PCT Pub. No.: WO2011/015822
PCT Pub. Date: Feb. 10, 2011

(65) Prior Publication Data
US 2012/0155734 A1    Jun. 21, 2012

(30) Foreign Application Priority Data

Aug. 7, 2009   (GB) .................................. 0913930.4

(51) Int. Cl.
| | |
|---|---|
| *G06K 9/00* | (2006.01) |
| *A61B 6/00* | (2006.01) |
| *A61B 5/05* | (2006.01) |

(52) U.S. Cl.
USPC .................. 382/131; 378/4; 378/21; 600/410

(58) Field of Classification Search
USPC ......... 382/128, 129, 130, 131, 132, 133, 134, 382/151, 294; 378/4, 8, 21–27, 101, 901; 600/37, 407, 410, 425, 437; 601/153; 128/920, 922
See application file for complete search history.

(56) References Cited

U.S. PATENT DOCUMENTS

| | | | | |
|---|---|---|---|---|
| 5,633,951 | A | * | 5/1997 | Moshfeghi .................... 382/154 |
| 2003/0156111 | A1 | | 8/2003 | Joshi et al. |

FOREIGN PATENT DOCUMENTS

| | | |
|---|---|---|
| WO | 0014668 | 3/2000 |
| WO | 03107275 A2 | 12/2003 |

(Continued)

OTHER PUBLICATIONS

Morgan et al.: "Registration of Preoperative MR Intraoperative Ultrasound Images for Guiding Minimally Invasive Prostate Interventions", Centre for Medical Image Computing, Dept. of Medical Physics & Bioengineering, University College, London, UK, d.morgan@ucl.ac.uk.

(Continued)

*Primary Examiner* — Abolfazl Tabatabai
(74) *Attorney, Agent, or Firm* — Park, Vaughan, Fleming & Dowler LLP

(57) ABSTRACT

An embodiment of the invention provides a method and apparatus for registering two medical images with one another. A first medical image including a representation of a biological organ of a subject or for a population is obtained and the surface of the organ is identified in the first medical image. The identified surface is then used to construct a 3D geometric surface model of the organ. The geometric model is used to derive a motion model that incorporates information on the physical material properties of the organ and external forces that cause the organ to move and deform. A second medical image including a representation of the organ of the subject (or another subject, in the case that the first medical image is an atlas image) is obtained and an alignment is determined between a first surface normal vector field for the organ surface, derived from the geometric model, and a second surface normal vector field for the organ surface, derived by filtering the second medical image. The alignment accommodates deformation of the geometric model in accordance with the motion predicted by the motion model. The first and second medical images can then be registered with one another based on said determined model-to-image vector alignment (MIVA).

26 Claims, 5 Drawing Sheets

(56) References Cited

FOREIGN PATENT DOCUMENTS

| WO | 2008041125 A2 | 4/2008 |
|---|---|---|
| WO | 2009052497 A2 | 4/2009 |

OTHER PUBLICATIONS

Penney et al.: "Cadaver Validation of Intensity-Based Ultrasound to CT Registration", Centre for Medical Image Computing, University College, London, UK, g.penney@cs.ucl.ac.uk, doi:10, 1016/j.media. 2006.01.003.
Penney et al.: "Registration of Freehand 3D Ultrasound and Magnetic Resonance Liver Images", Division of Imaging Sciences, Guy's Hospital, London, UK, Jan. 6, 2003, doi:10.0161/j.media.2003.07. 003.
Roche et al.: "Rigid Registration of 3-D Ultrasound With MR Images: A New Approach Combining Intensity and Gradient Information", 0278-0062, 2001 IEEE, Publisher Item Identifier S 0278-0062(01) 09303-X.
Staib et al.: "Boundary Finding With Parametrically Deformable Models", IEEE Log No. 9202384, 0162-8828/92, 1992 IEEE.
Wein et al.: "Automatic CT-Ultrasound Registration for Diagnostic Imaging and Image-Guided Intervention", 1361-8415, 2008 Elsevier B.V., doi: 10.1016/j.media.2008.06.006, www.elsevier.com/locate/media.
Wu et al.: "Registration of Organ Surface With Intra-Operative 3D Ultrasound Image Using Genetic Algorithm", Clinical Research Unit, Tan Tock Seng Hospital, Singapore, LNCS, pp. 383-390, Springer-Verlag Berlin Heidelberg 2003.
Xu et al.: "Real-Time MRI-TRUS Fusion for Guidance of Targeted Prostate Biopsies", Comut Aided Surg, Sep. 2008: 13(5) 255-264, doi: 10.1080/10929080802364645.
Zhang et al.: "Adaptive Non-Rigid Registration of Real Time 3D Ultrasound to Cardiovascular MR Images", Wolfson Medical Vision Lab, Department of Engineering Science, N. Karssemeijer and B. Lelieveldt (Eds.): IPMI 2007, LNCS 4584, pp. 50-61, 2007.
McInerney et al.: "Deformable Models in Medical Image Analysis: A Survey", Medical Image Analysis (1996) vol. 1, No. 2, pp. 91-108, Oxford University Press.
Mohammed et al.: "A Combined Statistical and Biomechanical Model for Estimation of Intra-Operative Prostate Deformation", T. Dohi and R. Kikinis (Eds.): MICCAI 2002, LNCS 2489, pp. 452-460, 2002, Springer-Verlag Berlin Heidelbers 2002.
Hu et al.: "Modelling Prostate Gland Motion for Image-Guided Interventions", F. Bello, E. Edwards (Eds.): ISBMS 2008, LNCS 5104, pp. 79-88, Springer-Verlag Berlin Heidelbert 2008.
Kirkham et al.: "How Good is MRI at Detecting and Characterising Cancer Within the Prostate?", available at www.sciencedirect.com.
Frangi et al.: "Multiscale Vessel Enhancement Filtering", Image Sciences Institute, Utrecht University Hospital.
Figueiredo et al.: "Performance of the EM Algorithm on the Identification of a Mixture of Watson Distributions Defined on the Hypersphere", REVSTATE—Statistical Journal, vol. 4, No. 2, Jun. 2006, pp. 111-130.
Descoteaux et al.: "Bone Enhancement Filtering: Application to Sinus Bone Segmentation and Simulation of Pituitary Surgery", J. Duncan and G. Gerig (Eds.): MICCAI 2005, LNCS 3749, pp. 9-16, 2005, Springer-Verlag Berlin Heidelberg 2005.
Cootes et al.: "Active Shape Models—Their Training and Application", Computer Vision and Image Understanding, vol. 61, No. 1, January, pp. 38-59, 1995.
Beichel et al.: "Robust Active Appearance Models and Their Application to Medical Image Analysis", IEEE Transactions on Medical Imaging, vol. 24, No. 9, Sep. 2005.
Cootes et al.: "Active Appearance Models", Proc. European Conference on Computer Vision, 1998, vol. 2, pp. 484-498, Springer 1998.
Aylward et al.: "Registration and Analysis of Vascular Images", International Journal of Computer Vision 55(2/3), pp. 123-138, 2003.
Ahmed et al.: "Active Surveillance and Radical Therapy in Prostate Cancer: Can Focal Therapy Offer the Middle Way?", World J Urol (2008) 26:457-467, DOI 10.1007/s00345-008-0317-5.
Yipeng Hu et al., "A Statistical Motion Model Based on Biomechanical Simulations for Data Fusion during Image-Guided Prostate Interventions", MICCAI 2008, Part I, LNCS 5241, pp. 737-744.
King A P et al., "Tracking Liver Motion Using 3-D Ultrasound and a Surface Based Statistical Shape Model", IEEE, Dec. 9, 2001.
Wei Shao et al., "Evaluation on Similarity Measures of a Surface-to-Image Registration Technique for Ultrasound Images", MICCAI, LNCS 4191, Jan. 1, 2006, pp. 742-749.
Chung-Lin Huang et al, "3-D Positron Emission Tomography Emission Scans Registration and Transmission Scan Synthesis", IEEE, US, vol. 2, pp. 1508-1512.

\* cited by examiner

APPARATUS AND METHOD FOR REGISTERING TWO MEDICAL IMAGES

FIELD OF THE INVENTION

The present invention relates to registering two medical images with one another, especially where the two images are obtained by different imaging techniques.

BACKGROUND OF THE INVENTION

A variety of medical imaging techniques are known, including magnetic resonance (MR) imaging, X-ray computed tomography (CT), radionuclide imaging, optical imaging, and ultrasound (US). Other imaging techniques may be developed in the future. These imaging techniques may produce a two-dimensional (2D) array of pixels (a conventional image) or a three-dimensional (3D) array of voxels, which conceptually represent slices through a physical object. Each pixel or voxel is assigned a value or "intensity" related to one or more physical properties of tissue at a particular point, peculiar to the particular imaging method used. The term "image" as used herein encompasses both 2D and 3D data sets unless the context indicates otherwise.

In some situations, it is desirable to be able to perform multimodal image registration, i.e. aligning images of the same body region but obtained through different imaging techniques. This is often highly challenging due to the large differences in the intensity characteristics between images obtained using different imaging techniques. In addition, fundamental differences between the underlying physics and image formation processes peculiar to each imaging method may also give rise to modality-specific artefacts. A further problem is that for a deformable structure, which includes most of the soft tissue organs of the body, physical deformations and motion with respect to neighbouring structures may occur between imaging sessions. These effects further complicate the problem of image registration.

One well-known approach to image registration involves so-called intensity-based algorithms, such as those which seek to maximise information-theoretic similarity measures. These techniques implicitly assume a probabilistic relationship between the intensities in one image and those in the corresponding regions of another image for mapping one intensity map to another. However, this assumption is often not reliable in a situation where different imaging methods that exploit different physical properties are used to obtain an image of the same anatomical region.

In an alternative approach, commonly referred to as feature-based registration, the input images are first reduced to simpler geometric representations (such as a set of points or surfaces) and these geometric representations are then registered with one another. This approach typically involves identifying corresponding features, such as anatomical landmark points, tissue boundaries, etc, in each image. The process of extracting features from image data, known as image segmentation, can be performed using segmentation software and may in some cases involve little or no user interaction. However, in many other cases, the segmentation must be performed manually by an expert observer. Therefore, the feature-based approach to registration is often impractical if available computer-based automatic segmentation methods are unavailable or fail, or if manual segmentation of at least one of the images is prohibitively time-consuming and labour-intensive.

The reliance on feature-based image registration is a particular problem in time-critical applications, such as image-guided surgery, since images obtained during such a procedure are typically of much poorer quality than those obtained outside the surgical setting. These image are therefore very often difficult to segment automatically or within a clinically acceptable timescale (i.e. seconds to a few minutes).

Since ultrasound imaging is safe, non-invasive, inexpensive, portable and widely available in hospitals, it is used routinely to provide real-time surgical guidance during a wide range of medical procedures. However, there is currently a pressing clinical need for multimodal image registration methods that enable ultrasound images to be accurately registered with other types of image to enable accurate guidance of many procedures by visually augmenting ultrasound images with anatomical and pathological information derived from diagnostic quality images (especially MR and X-ray CT images). Such information includes the location of pathology (e.g. a cancerous tumour) or organs that are not visible in the ultrasound images obtained during a procedure (for example, because they are poorly visualised or lie outside the field-of-view of the image) or a representation of a treatment or biopsy sampling plan that has been defined using information derived from images acquired specifically for the purposes of disease diagnosis or surgical planning combined with diagnostic information from other sources.

If multimodal image registration can be performed accurately, the location of a tumour identified in an MR image, for example, can be displayed superimposed on ultrasound images ordinarily obtained during a surgical procedure for the purposes of guiding surgical instruments. This aids the clinician by providing visual information on the location of the tumour relative to the current position of surgical instruments, so that tissue biopsy samples can be collected from precise locations to confirm a diagnosis, or an intervention to treat the tumour can be performed with sufficient accuracy that the tissue within a region that encloses the tumour plus a pre-defined surgical margin are destroyed or removed. However, if the diagnostic image information is not accurately aligned with intra-procedural images, errors may be introduced that limit the accuracy of the biopsy as a diagnostic test or that can severely limit clinical efficacy of the intervention. In practice, such errors include: inaccurate placement of biopsy needles, failure to remove an adequate margin of tissue surrounding a tumour such that malignant cancer cells are not completely eradicated from the organ, and unnecessary damage to healthy tissue with an elevated risk of side-effects related to the procedure in question.

Unfortunately, standard intensity-based multimodal registration algorithms are known to perform poorly with ultrasound images, largely due to high levels of noise, relatively poor soft-tissue contrast and artefacts typically present in clinical ultrasound images. Furthermore, image segmentation is challenging for the same reasons and therefore the use of many feature-based registration approaches is precluded for most clinical applications.

Several authors have investigated a hybrid registration technique, variously known as surface-to-image registration, feature-to-image registration, model-to-image registration, or model-to-pixel registration. In this approach, a geometric representation of the organs of interest is generated by segmenting a reference image to extract features, such as surface boundaries, tubular structures, etc, in the same way as traditional feature-based approaches. However, unlike the feature-based method, these features are matched directly to the pixel/voxel intensity values of a second image, which has not been segmented explicitly, but may have been processed in some way, for instance, to enhance certain features, such as boundaries. This process is normally achieved by minimising a mathematical cost function to determine a transformation that provides the best alignment between the features from the first image and the intensity values of the second image.

The most extensively investigated example of the above technique is the so-called active shape model developed by Cootes et al. 1995. In this method the geometric model is represented as a statistical shape model which deforms iteratively to fit to the boundary of an object in an unseen image. A closely related method is the so-called active appearance model, see Cootes et al. 1998 and Beichel et al. 2005. In this method, the statistical variation in the image intensity (or appearance) in the local region of the surface of a statistical shape model is included into the model at the training phase. This information is then used to match the shape model to an object boundary in an unseen image by maximising a measure of the similarity between the local intensity characteristics in the image around points on the deforming boundary and the corresponding intensity variation learnt by the active appearance model. One such measure is the sum-of-squared differences. Both active shape and active appearance models have been applied successfully to a wide range of image analysis problems in computer vision and medical imaging, particularly image classification, image segmentation, and image registration. However, both methods are known not to work well when the unseen image is corrupted in some way such that object boundaries are occluded or the intensity characteristics of the unseen image differ substantially from the images used to train the model. This situation is very common in medical image applications, particularly during image-guided interventions where (unseen) images obtained during an intervention are typically noisy, contain artefacts, and include medical instruments introduced into the patient. There are also many situations where, due to noise, artefacts and variability between patients, the variation in image intensity around points on the boundary of an object in a reasonably-sized set of training images is too wide for meaningful parametric statistical measures to be determined. In this case, the assumptions of the active appearance model method may break down.

Shao et al. 2006 describe one example of the above technique, which is used for aligning MR images of the pubic arch with US images obtained via a trans-rectal ultrasound (TRUS) probe. This technique involves manually identifying a bone surface in an MR image. A rigid transformation is then identified to align this surface with the US image, based on image properties such as regions of high intensity or the image intensity gradient.

Aylward et al. 2003 describe a model-to-image method for the registration and analysis of vascular images. The method includes using centre-line tracking to build a model of a vascular network from a first image, such as an MR image. This model is then subjected to a rigid transformation to align the model with a second image, such as an US image, on the assumption that centre-line points in the model correspond to bright lines in the image. Aylward et al. go on to investigate the impact of non-rigid deformations on this approach.

Wu et al. 2003 describe a model-to-pixel registration approach for prostate biopsy. The authors use a genetic algorithm (GA) that operates on a statistical model of the prostate boundary to evolve a population of 2D boundaries for prostate that are then matched to a gradient map from a US image. Each candidate (individual) in the GA corresponds to a specific rigid-body transformation and the better the match with the US gradient image, the higher the fitness of that individual. It is contemplated that the individuals could also include parameters to permit deformation (non-rigid transformation), or alternatively such deformation could be added as a final step onto the best-fit rigid registration.

King et al. 2001 describe the registration of preoperative MR or CT images with an intraoperative US image for liver treatment. A statistical shape model is derived by segmenting multiple MR scans and determining a mean surface shape and modes of variation. The modes of variation are then restricted to a single parameter representative of changes caused by the breathing cycle. This model was then registered to the US image by way of (i) a rigid transformation, and (ii) a non-rigid transformation representative of organ deformation due to breathing. A probabilistic (Bayesian) model is used to perform this registration based on summing the image intensity over the (transformed) model surface.

Other approaches to US-based registration have been proposed, see especially Roche et al., 2001; Penney et al., 2004/2006; Zhang et al. 2007; and Wein et al. 2008. However, to date these have been demonstrated only for a few organs and for specialised applications, and rely on automatically converting at least one of the images into a form that is more amenable to performing a registration using established intensity-based methods. However, this conversion step is not trivial in many circumstances, and these alternative approaches have yet to be demonstrated for many medically significant applications, such as image-guided needle biopsy of the prostate gland and image-guided surgical interventions for the treatment of prostate cancer.

US 2003/015611 describes geometric models which are represented using medial atoms—a so-called "medial representation" or "m-rep". A method is described for registering an m-rep to an image by numerically optimising a local grey level intensity-based similarity measure, computed in the region of the m-rep surface.

WO 2009/052497, also specific to m-reps, describes a method for non-rigidly registering an m-rep model of an organ, derived from one image, to a second image. As discussed above, a typical scenario is when the model is derived from an image used for planning a surgical intervention, whereas the second (target) image is acquired during that intervention and the organ of interest has deformed between the times when the images were acquired. Finite element modelling is used to predict soft-tissue deformation and, more specifically, to provide training data for a statistical shape model. The model-to-image method is based on active appearance modelling as outlined above. Principal component analysis is applied to represent the statistical variation in image intensity in the local region of a model boundary in a linear form and, as in classical active appearance models, this information is then used to fit the model surface to the target image. However, this approach assumes that the intensity variation at corresponding locations across different training images adopts a Gaussian distribution, which may not be the case, particularly for interventional images.

Various computational models of organ motion for medical image registration have been proposed. For example, WO 2003/107275 describes the use of physiological models of organ motion due to respiration and cardiac motion to predict deformation between organs in two images that are subsequently registered non-rigidly, with a focus on the problem of registering PET and CT images. The motion models considered are based on deforming non-uniform rational B-spline (NURB) representations of organ surfaces and are not statistical in nature. The geometric model is created by segmenting both of the images to be registered, which is potentially problematic for surgical applications.

WO/2007/133932 discloses a method for the deformable registration of medical images for radiation therapy. Again, all input images must be segmented. In this approach, landmarks are identified in the images prior to registration (rather than performing a direct model-to-image registration).

A more general deformable image registration method is disclosed in WO 2008/041125, in which variations in the non-rigid behaviour of different parts of an image (for example, corresponding to different tissue types or mechanical discontinuities between tissue boundaries) may be accounted for by spatially varying the "flexibility" and/or non-Gaussian smoothing applied during registration.

Prostate cancer is a major international health problem, particularly affecting men in the Western World. Traditional treatment strategies involve either radical treatment of the whole gland—for example, by surgical excision or using radiotherapy—or pursuing an active surveillance/watchful waiting programme in which intervention is delayed in favour of monitoring the patient for signs of disease progression. Alternative minimally-invasive interventions for prostate cancer, such as brachytherapy, cryotherapy, high-intensity focused US, radiofrequency ablation, and photodynamic therapy are also now available, but the clinical efficacy of most of these treatment approaches has yet to be fully established through randomised controlled trials.

Up to 70% of patients treated for prostate cancer experience long term side-effects—principally sexual dysfunction and incontinence—caused by damaging the bladder, rectum, and/or the neurovascular bundles. Motivated by the potential for a reduced risk of side-effects compared with conventional treatments, there has recently been growing interest in techniques which enable the targeted treatment of prostate cancer in an effort to minimise damage to vulnerable structures, Ahmed et al. 2008. This had lead to interest in alternative treatment strategies, such as 'focal therapy', in which small volumes of the prostate (rather than the whole gland) are treated. It is anticipated by its clinical proponents that this will lead to a significant reduction in side-effects without compromising the therapeutic benefits of the treatment. Treatment costs should also be reduced as treatment times and hospital stays are much shorter. However, such targeted treatment approaches rely on accurate 3D mapping of cancer based on histological analysis of tissue samples obtained using needle biopsy and MR imaging.

Trans-rectal ultrasound (TRUS) imaging remains the most accessible and practical means for guiding needle biopsy and therapeutic interventions for prostate treatment. However, conventional (so-called 'B-mode') TRUS imaging is two-dimensional and typically provides very limited information on the spatial location of tumours due to the poor contrast of tumours with respect to normal prostatic tissue. Although there is some evidence that the use of microbubble contrast agents can improve the specificity and sensitivity of tumour detection, this method is not widely used and performing accurate, targeted biopsy and therapy using TRUS guidance alone is difficult in practice, particularly for the inexperienced practitioner. An alternative approach is to use preoperative MR images, which are registered to the TRUS images during a procedure, in order to accurately target tumours. Indeed, recent advances in functional and structural MR imaging techniques for localising and characterising prostate cancer have led to sensitivities and specificities that are now sufficiently high to be clinically useful for targeting localised therapy, Kirkham et al. 2006. However, the ability to accurately fuse anatomical and pathological information on tumour location, derived from MR images or a previous biopsy procedure, with TRUS images obtained during a procedure remains a significant technical challenge, mainly due to the differences in intensity between MR and TRUS images, which frustrate standard registration methods, as well as the significant deformation that occurs between the imaging sessions.

Morgan et al. 2007 describe various techniques for the registration of pre-procedure MR images to intra-procedure US images, especially for guiding minimally-invasive prostrate interventions. One technique is based on a form of feature registration, in which for both the MR and US image data, contours of the capsule surface of the prostate are manually drawn on a series of slices of the US image, and the apex and base points, which correspond to the entrance and exit of the urethra at the ends of the prostate gland, are manually identified. An image registration is then performed by finding a rigid transformation that minimises the cost of mapping from the apex points and the mid-band surface (as represented by a set of points on the surface) from one image to the apex points and mid-band surface of the other image.

Because of the long time required for contouring the US image during a surgical procedure, Morgan et al. also utilise a gradient-based, feature-to-image registration procedure. Using this method, an MR image is first segmented to extract the capsule surface of the prostate gland. Registration is performed by aligning MR surface normal vectors with gradient vectors of the TRUS image, calculated using Gaussian derivative filters, such that a cost function is minimised. However, this approach was found not to produce such accurate image registration, especially if the prostate gland has deformed significantly between the MR and US images. Much of this deformation is caused by the presence of the TRUS probe, which is always inserted into the rectum during US imaging, or an endorectal coil, which is sometimes used during MR imaging.

WO 00/14668 describes the construction of a 3D probability map of prostate cancer location, based on an analysis of computer reconstructions of excised prostate gland specimens. One intended use of these models is to direct ultrasound-guided prostate biopsy to maximise the probability of detecting cancer. To achieve this, registration of a geometric model containing the probability map to ultrasound images acquired during biopsy is required. A feature-based registration method is proposed, which requires segmentation of the prostate gland in the target, i.e. ultrasound, image to provide a patient-specific target model to which the (generic) probabilistic model is then registered by fitting the model surfaces.

WO 2008/122056 discloses an image-based method for the delivery of photodynamic therapy (PDT) for the treatment of prostate cancer and uses deformable registration of two images to deliver, monitor, and evaluate PDT. The registration method involves non-rigidly registering organ surfaces, segmented from each image, and using a finite element model or thin-plate spline model to interpolate the tissue displacement inside the organ. In the case of the finite element model, the displacement of the surface is used to set the boundary conditions for a finite element simulation given assumed mechanical properties for tissue. Again, this approach requires prior segmentation of both input images.

U.S. Pat. No. 5,810,007 discloses a method for registering ultrasound and x-ray images of the prostate for radiation therapy. This method requires the implantation of spherical fiducial markers to act as landmarks, which are subsequently rigidly aligned.

In a recent paper, Xu et al. (2008) state: "Currently, there is no fully automatic algorithm that is sufficiently robust for MRI/TRUS [Transrectal Ultrasound] image registration of the prostate".

SUMMARY OF THE INVENTION

The invention is defined in the appended claims.

One embodiment of the invention provides a method for registering two medical images. The method comprises obtaining a first medical image including a patient-specific representation of a biological organ of an individual subject or a representation of a biological organ for a population and identifying the surface of said organ in said first medical image. The surface can be used to obtain a geometric model that represents the three-dimensional shape of said organ for a subject or the representative shape of said organ for a population. The geometric model can then be used to obtain a motion model which can be used to predict the physical motion and deformation of said organ. The method further comprises obtaining a second medical image including a representation of said organ of said subject or another subject. An alignment is determined between surface normal vectors of said geometric model, which represent a first vector field, and estimated surface normal vectors of the organ surface derived by filtering said second medical image, which represent a second vector field. Determining the alignment includes applying a mathematical transformation to said geometric model to maximise a measure of orientational alignment between the first and second vector fields. The spatial position, orientation and shape of said geometric model and of the first vector field are changed in accordance with said motion model to achieve said alignment. The first and second medical images can then be registered with one another based on said determined alignment.

Such an approach allows two medical images to be registered with one another. The first medical image includes a representation of an organ and a physical feature of that organ which can be identified, and which is also represented in the second medical image. The identified feature may be a surface that is then used to construct a 3D geometric model of the organ or some other physical property that provides a convenient representation of the 3D geometry of the organ. The second medical image includes a representation of the organ. An alignment may be determined between the first vector field, derived from the geometric model, and the second vector field, derived automatically by filtering the second medical image. The alignment accommodates deformation of the geometric model in accordance with a mathematical model of the physical motion and deformation of the organ/feature. The first and second medical images can then be registered with one another based on the determined alignment.

The first and second medical images will generally originate from different imaging methods, which causes the images to have different properties regarding the visibility of various organs and pathological conditions. For example, the first medical image may be a CT or MR image obtained before a surgical procedure, from which a detailed diagnosis and surgical plan can be generated, while the second medical image may be an ultrasound (US) image, obtained during the surgical procedure when the time available for processing new images is typically very limited. As a consequence, the processing of the second image, in particular determining the alignment for registering the first and second medical images, must be performed quickly with little or no human involvement. The approach described herein for determining the alignment has been found experimentally to fulfil this requirement.

The approach described herein can be applied to a wide range of anatomical organs. In some cases, the first and second images may include (at least portions of) multiple organs and the modelling and alignment may utilise multiple features related to those organs. The approach is particularly relevant to solid organs that have a clearly identifiable surface which provides a suitable feature for the described approach, and organs that are deformable—i.e. comprise soft tissue. The approach described herein has been investigated experimentally with respect to the prostate gland.

In one embodiment, constructing the geometric model includes building a patient-specific finite element mesh of organ surfaces that have been identified in the first image. The finite element mesh may be generated from a spherical harmonic representation of the identified surfaces.

In one embodiment, a set of simulated deformations of the finite element model of the organ determined from the first image are performed using computational finite element analysis. Constructing a finite element model may include the use of solid modelling tools to convert the geometric surface model into a volumetric, finite element mesh representation of the organ(s) of interest, and assigning physical material properties, such as Young's Modulus and Poisson's Ratio, that are within the known physiological range of such properties, to elements of the model. Each simulation calculates the physical deformation of the organ model for particular material properties and boundary conditions. The boundary conditions specify, for example, which parts of the model are fixed and how other parts move in accordance with externally applied forces. A statistical motion model can then be generated by performing principal component analysis of the displacements of the finite element mesh nodes, calculated by the simulations. The statistical motion model provides a 3D representation of the motion and deformation of the finite element model—and hence the motion and deformation of the organ—as predicted by finite element analysis. The use of the principal component analysis enables a simpler, low-dimensional representation of the predicted displacement of the node points of the underlying finite element model, which therefore reduces the processing requirements (and hence time required) when determining the alignment.

In one embodiment, determining the alignment includes initially identifying one or more points representing anatomical landmarks in the second medical image and matching them to corresponding points in the geometric model in order to approximately orientate the geometric model with respect to the second medical image. For example, in the case of the prostate gland, the anatomical landmarks may comprise the points of entry and exit of the urethra at the base and apex of the gland. Since the number of points to be identified is generally rather small (often a handful at most), this can be done within the time constraints of a surgical procedure. The use of this matching procedure helps to limit the search space when determining the alignment, thus reducing the time required for finding the alignment and also reducing the chances of not finding the appropriate alignment.

In one embodiment, filtering the second medical image is based on an eigenanalysis of second order Gaussian derivatives. The feature, derived from the first image, is the surface of a solid organ and is represented by a 3D vector field comprising a set of 3D point co-ordinates and a set of 3D vectors. The point co-ordinates define points on the organ surface and the vectors are surface normal vectors defined at each surface point. The method also includes computing the eigenvalues of the Hessian at each voxel in the second medical image to classify the local intensity structure in terms of being locally sheet-like (indicating a surface) or ridge-like (indicating a tubular structure), and the eigenvectors of the Hessian at each voxel in the second medical image to determine estimates of the surface normal vectors.

In one embodiment, the second vector field, derived by filtering the second medical image, is considered to be a noise-corrupted version of the first vector field derived from the geometric model. The alignment is then determined on the basis of maximising the joint probability of the noise. Other approaches for determining an alignment may be to minimise a cost function or to use some other form of numerical optimisation technique—e.g gradient-descent, genetic algorithms, etc.

In one embodiment, the alignment is determined using a vector similarity measure that quantifies the orientational alignment between the first and second vector fields. The vector similarity measure can account for direction-dependent artefacts in the second medical image when this second medical image is an ultrasound image. Note that US imaging is particularly susceptible to such artefacts and the similarity measure therefore provides a robust approach for determining the alignment in their presence.

In one embodiment, the determined alignment corresponds to deforming the geometric model to provide a best fit to the second medical image. Registering the first and second medical images with one another based on the determined alignment includes calculating a dense displacement field comprising displacements that map from the initial geometric model to the deformed geometric model. The same displacements can then be used to map from the first medical image (corresponding to the original geometric model) to the second medical image (corresponding to the deformed geometric model), or vice versa.

An embodiment of the invention provides a computer program for implementing a method such as described above. The computer program may comprise multiple pieces of software and may be executed on one or more physical machines. The computer program may be supplied on a computer readable storage medium, such as a CD, DVD or flash memory, or made available for download over a network such as the Internet.

Another embodiment of the present invention provides an apparatus for registering two medical images. The apparatus comprises an image processing system for identifying a surface of a solid organ or other feature in a first medical image that includes a representation of that feature. The apparatus further comprises a modelling system for using the identified surface to construct a 3D geometric model of the organ feature, the geometric model including a mathematical model of the expected physical motion and deformation of the organ feature, for example a statistical shape or motion model. The apparatus further comprises a numerical optimisation system for determining an alignment between surface normal vectors of said geometric model, which represent a first vector field, and estimated surface normal vectors of the organ surface derived by filtering a second medical image that includes a representation of the organ, which represent a second vector field. Determining the alignment includes applying a mathematical transformation to the geometric model to optimise a measure of orientational alignment between the first and second vector fields. The alignment accommodates deformation of the geometric model in accordance with the motion model specified for the organ feature. The apparatus further comprises an image registration system for registering the first and second medical images with one another based on the determined alignment. The apparatus further comprises a system for visualising the first and second medical images following registration using the determined alignment.

Such an apparatus may be implemented by one or more computer systems, each provided with one or more suitable processors and memory, plus any other appropriate facilities (such as data communication links). The apparatus may implement the specified functionality under the control of suitable software running on the processor(s). Alternatively, some or all of the functionality may be implemented by special-purpose hardware.

BRIEF DESCRIPTION OF THE DRAWINGS

Various embodiments of the invention will now be described in detail by way of example only with reference to the following drawings.

DETAILED DESCRIPTION

Figure 1:
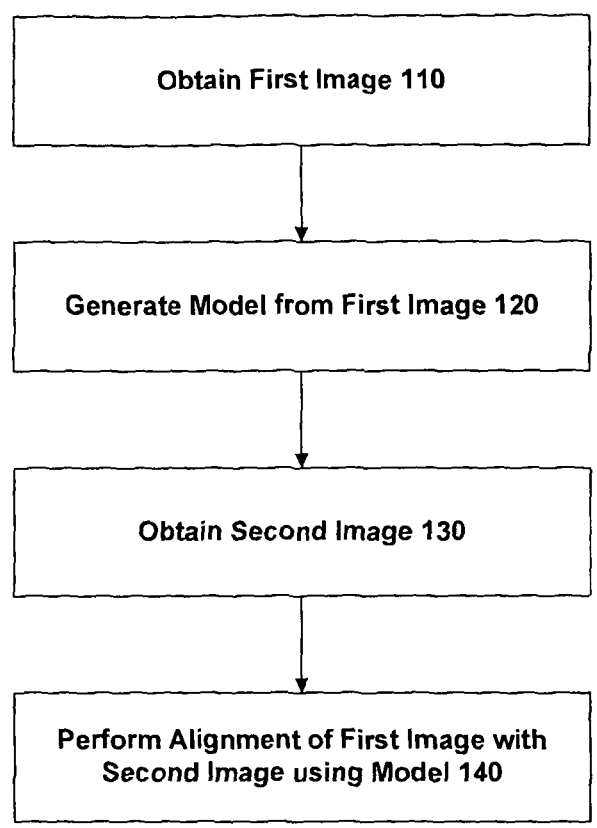
FIG. 1 is a flowchart providing an overview of a method in accordance with one embodiment of the invention.

The approach described herein provides a computerised method for automatically registering, i.e. spatially aligning, two images of the same object by registering a geometric model of the object, derived from one image, to the other image. The method, referred to herein as a Model-to-Image Vector Alignment (MIVA) method, has been devised and tested in one embodiment for registering magnetic resonance (MR) images to transrectal ultrasound (TRUS) images in order to accurately guide surgical procedures for the diagnosis and treatment of prostate cancer. In this case, the geometric model is derived from an MR image and comprises surface meshes that represent the prostate gland and surrounding organs, including the rectum, pelvis and bladder. The model describes the shape and size of an individual's prostate, the prostate location relative to nearby anatomical structures, and the location of regions with a high probability of containing tumours (identified by an expert clinical observer from the MR image combined with previous biopsy results). Such information is critical for accurately guiding and targeting needle biopsy and minimally-invasive surgical interventions and augments the very limited information currently provided by TRUS imaging that is used routinely to guide such procedures.

In contrast to existing methods, the present approach is generally able to use standard geometric models. These have the advantage that they are widely employed in current radiological analysis and computer-aided surgical planning applications. Consequently, a wide range of well-developed solutions exist for producing such geometric model. Examples of geometric models include triangulated surface meshes and tetrahedral meshes commonly used for finite element analysis. Note that a geometric model can be either rigid, indicating no shape change, or deformable. The latter is particularly relevant where changes in shape may occur between the acquisition of different images or where significant shape change occurs over a sample population. Examples of deformable models include active contours and statistical shape models, see McInerney and Terzopoulos, 1996. For the deformable case, the displacement of structures inside a surface can be predicted using, for example, a statistical model of deformation based on simulations performed using finite element analysis software (Hu et al. 2008).

The approach described herein enables a non-rigid registration of MR images and 3D TRUS images that compensates for gland motion and is sufficiently fast for intraoperative use. Finite element analysis and statistical shape modelling are combined to generate a compact model of the prostate gland motion that arises insertion of when a TRUS probe is inserted into the rectum (see Mohamed et al., 2002, and Hu et al., 2008). This allows the construction of patient-specific, biomechanically-informed statistical motion models (SMMs) from preoperative MR images in order to predict physically realistic deformations, as well as to provide a well-constrained transformation model for non-rigid registration of MR and TRUS images.

The approach described herein differs from an "m-rep" approach in that a geometric model, derived from one image, is registered directly to a second image without using prior image intensity information from the first image. Consequently, the present approach is independent of the intensity differences between the input images, and is therefore more appropriate for challenging multimodal registration problems.

FIG. 1 is a flowchart providing an overview of a method in accordance with one embodiment of the invention. The method commences with obtaining a first image 110. This first image will often be obtained using a high-quality imaging method, such as MR or CT imaging. The first image may also be an atlas image that represents generic anatomy for a population.

The next operation of FIG. 1 is to generate a patient-specific (geometric) model from the first image 120. For example, if the first image depicts the prostate gland and neighbouring organs, the model defines the locations and boundaries of these organs. The model generation may be performed fully automatically or may require manual input from a human expert, such as to outline the organ boundaries using image segmentation software. Note that since human input can be performed in advance of any surgical procedure, this does not usually represent a time-critical operation.

The third operation of FIG. 1 is to obtain a second image 130, which is assumed to have a substantial overlap with the first image. The second image may be obtained using US during a surgical procedure. The alignment of the second image with the first image is now performed at operation 140 on the basis of the result of aligning the second image to the generated model.

In accordance with one embodiment of the invention, the processing of FIG. 1 is implemented as a two-stage scheme for image registration. The first stage, comprising operations 110 and 120 from FIG. 1, occurs before a surgical procedure and can be considered as a planning stage. During this phase, time is available for an expert observer to process images by hand if necessary. In addition, many images of diagnostic quality can be processed efficiently with minimal user-interaction using modern software tools.

As described in more detail below, the planning stage may involve: (i) building a patient-specific finite element mesh of the prostate gland and surrounding anatomy from a preoperative MR image; (ii) performing a series of finite element analysis simulations of gland motion (including deformation) using randomly sampled material properties and boundary conditions to provide a set of training data for a statistical motion model (SMM); and (iii) constructing a SMM for the prostate gland by applying principal component analysis (PCA) to the predicted finite element mesh node displacements. The SMM may be considered to be a special case of a statistical shape model which represents patient-specific variation in prostate gland shape due to deformation predicted by the finite element simulations.

The second stage, comprising operations 130 and 140 from FIG. 1, occurs during a surgical procedure and can be considered as the registration stage. Note that an image obtained during this phase may be of somewhat lower quality (e.g. more noise) than a diagnostic image obtained during the first phase.

As described in more detail below, the registration stage may involve: (i) computing transrectal ultrasound (TRUS) image feature vectors using second derivatives of the image intensity; and (ii) iteratively optimising the rigid-body and SMM shape parameters until the likelihood of a particular set of registration parameters given the TRUS image is maximised.

Figure 2:
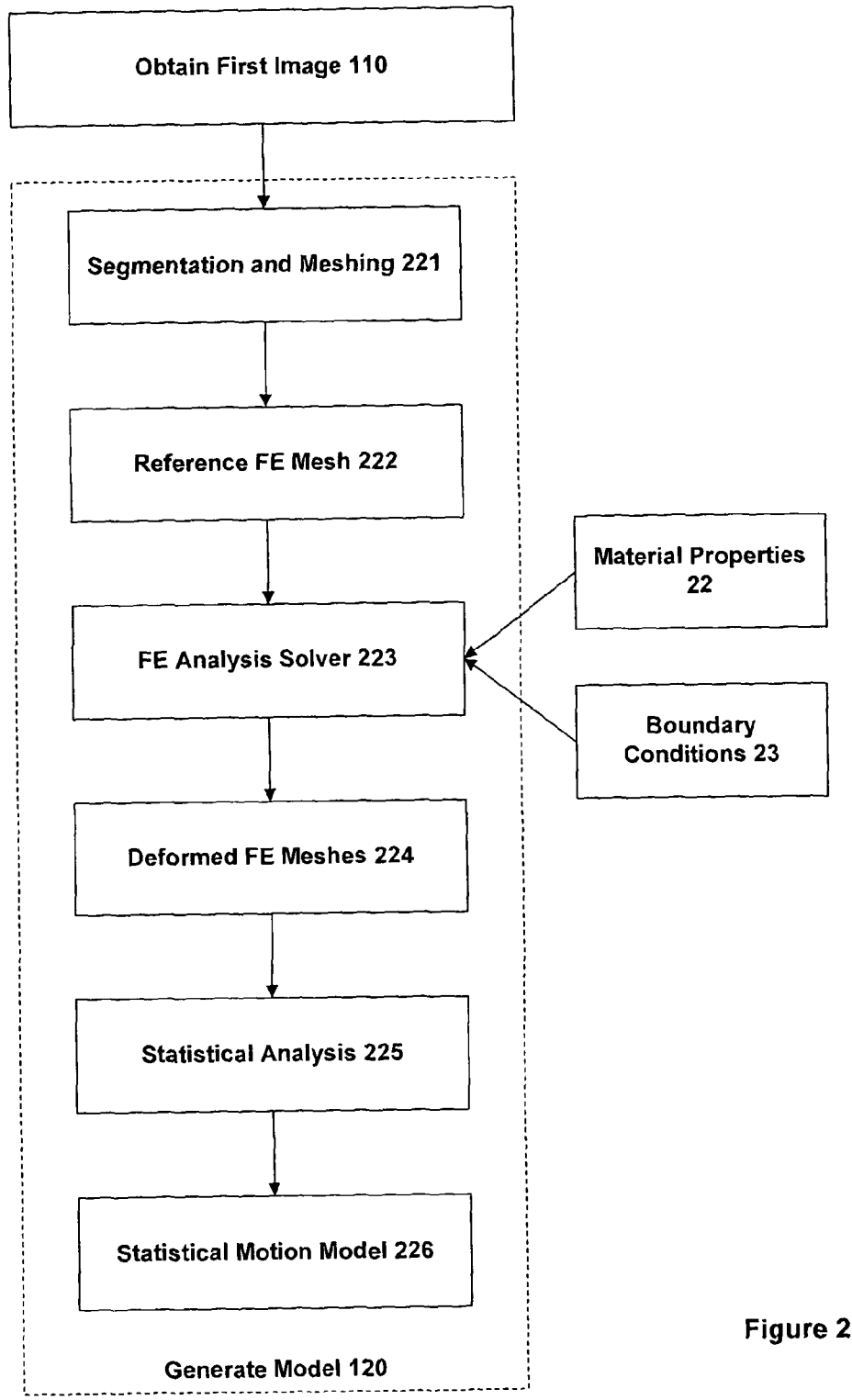
FIG. 2 is a flowchart illustrating in more detail certain aspects of the method shown in FIG. 1 in accordance with one embodiment of the invention.

The flowchart of FIG. 2 illustrates one particular embodiment of the invention, in which operation 110 of FIG. 1 involves acquiring an MR image of the prostate gland and the surrounding organs. The remainder of FIG. 2 shows the generation of a statistical motion model (SMM) from this acquired MR image (corresponding to operation 120 of FIG. 1) in accordance with one embodiment of the invention. Note that the SMM is generated prior to a surgical procedure and therefore is not subject to such stringent timing constraints as intra-operative activities.

In operation 221, the diagnostic MR images are manually segmented into regions that define the geometry of the prostate gland (divided anatomically into the central and peripheral zones), the pelvic bone, the rectum and the bladder at the base of the prostate gland. The prostate gland can be described initially using a spherical harmonic representation, which is then converted into a triangulated surface mesh. The lower part of the pelvis can also be meshed.

At operation 222, a reference finite element (FE) mesh is generated by importing the surfaces into a commercial FE analysis software package ANSYS (ANSYS, Inc., Canonsburg, Pa., USA). This allows a FE model to be constructed with 50-60,000 tetrahedral elements using the solid modelling tools provided by the software. Ten-node tetrahedral elements can be used, as these support non-linear geometries using unstructured meshes. The mesh can be refined around the region of rectum to allow the TRUS probe to be modelled directly in simulations without re-meshing. Elements within all regions of interest are labelled and each is assigned material properties randomly sampled from a physiological range.

The above processing produces an finite element model of the prostate as observed in the MR image. A set of simulations are now performed on this observed model using finite element analysis to understand how the prostate gland deforms subject to different boundary conditions and different assigned material properties. In particular, the insertion of a TRUS probe into the rectum will deform the prostate gland by exerting forces transmitted through the rectal wall.

In one embodiment, material properties 22 and boundary conditions 23 for each finite element analysis simulation are determined as follows: The displacement on the surface of the pelvis is set to zero for all simulations. A random configuration of the TRUS probe in terms of its pose and the diameter of the water-filled sheath are set for each simulation, Hu et al., 2008. These represent the boundary conditions 23.

The material properties are determined by assuming that all tissues behave as isotropic, linear elastic materials. Since the assumption of incompressibility (Poisson's ratio, v=0.5) may not be appropriate for organs such as the prostate gland because of gain and loss of blood and other fluids and the presence of a collapsible urethra, both the Young's modulus and the Poisson's ratio assigned to different materials in the FE model are assumed to be unknown and are therefore assigned values sampled randomly from an interval that represents the known physiological range for each variable during each simulation.

After assigning sampled material properties and boundary conditions for each of 500 simulations, the node displacements are computed at operation 223 using the preconditioned conjugate gradient iterative equation solver implemented in ANSYS to produce a set of deformed finite element meshes 224. The inherent correspondence between the mesh node points of the various deformed prostate models then allows a principal component analysis (PCA) to be applied at operation 225 directly to the 3D displacements of the mesh nodes. In particular, for each of M (=500) simulated gland deformations, the displacement of each of N nodes in the prostate gland mesh can be calculated and combined to form a $3N \times 1$ vector, d, which describes the predicted motion of the prostate gland for a given set of material properties and boundary conditions. The principal modes of variation in d can then be calculated using PCA. If $m_0$ represents the undeformed gland and is a vector containing the 3D coordinates of the nodes of the original finite element model, determined from the MR image, then a deformed gland is defined by vector m, given by:

$$m = m_0 + \bar{d} + \sum_{i=1}^{L} c_i e_i, \qquad (1)$$

where $\bar{d}$ is the mean node displacement vector, $e_i$ is the $i^{th}$ eigenvector of the covariance matrix, and $c_i$ is a scalar weight. $L \leq M$ was chosen so that the resulting statistical motion model 226 covered >99% of variance in the training data; typically, $L \sim 15$. Additionally, the normal vectors at the nodes (vertices) of the triangulated surface were computed.

Figure 3:
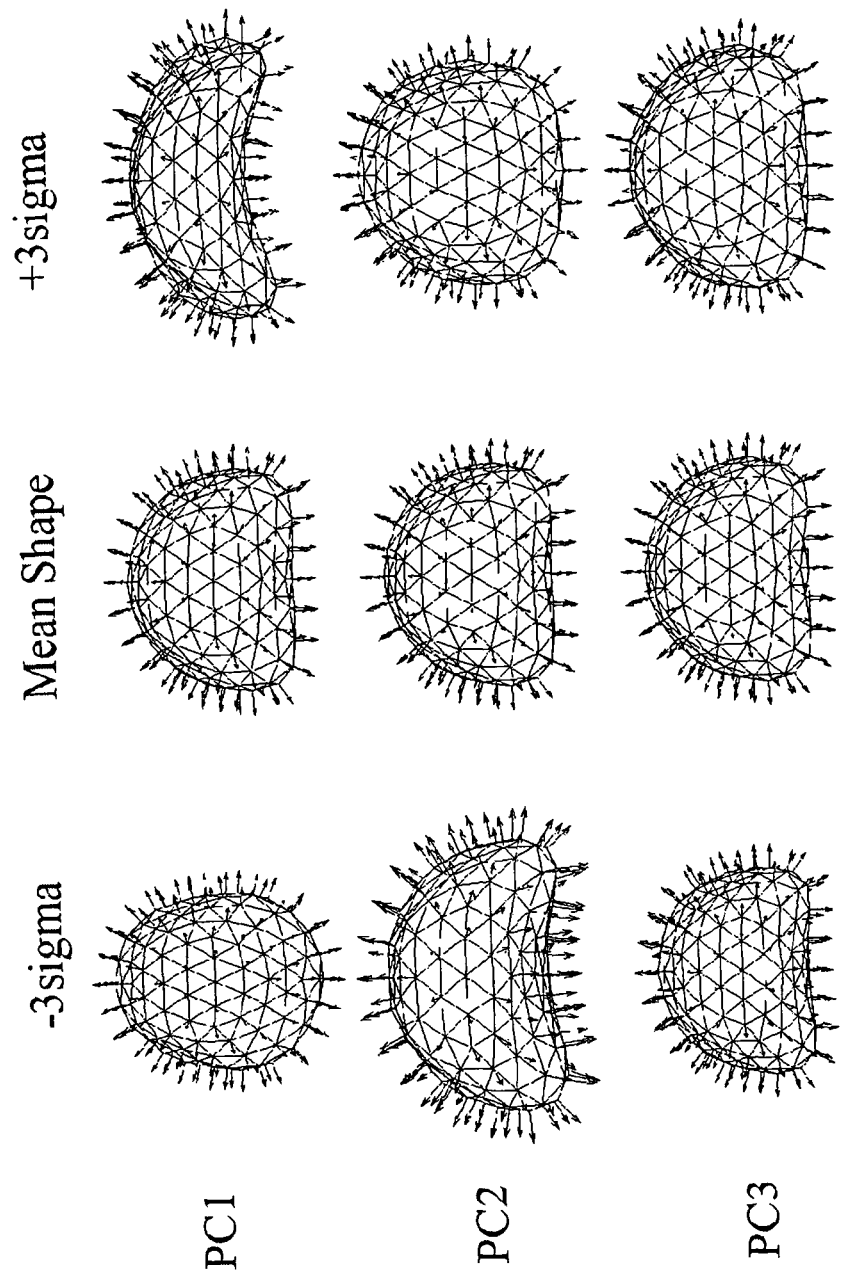
FIG. 3 is a schematic illustration of certain components from a statistical motion model for the prostate gland derived using the method of FIG. 2 in accordance with one embodiment of the invention.

FIG. 3 illustrates an example of the shape changes of a prostate model corresponding to the first three modes of the shape variation resulting from the processing of FIG. 2. In particular, FIG. 3 depicts the first 3 modes (PC1, PC2 & PC3) of an SMM showing the variation in prostate shape with respect to the model parameters (sigma is the standard deviation of the parameter corresponding to each mode). The surface normal vectors at the nodes of the triangulated mesh surfaces are indicated by arrows.

PCA in effect produces a reduced number of parameters for describing the shape of the prostate model. These parameters represent (in a generally complex fashion) the input boundary conditions and material properties. Having such a reduced number of parameters helps to make the subsequent image registration procedure, as described below, more efficient since only these parameters need to be estimated by numerical optimisation during the registration.

Figure 4:
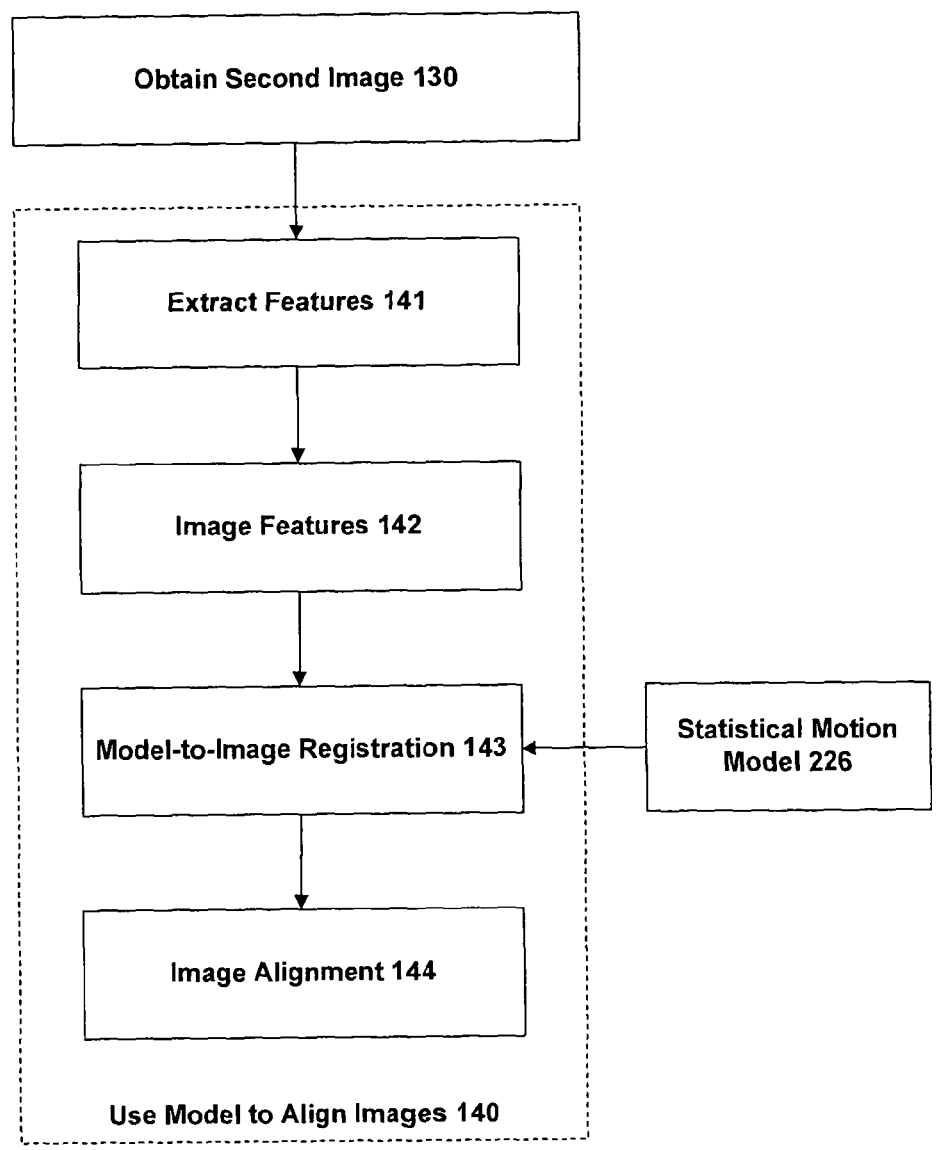
FIG. 4 is a flowchart illustrating in more detail certain aspects of the method shown in FIG. 1 in accordance with one embodiment of the invention.

FIG. 4 is a flowchart illustrating the use of the SMM to perform multimodal image alignment in accordance with one embodiment of the invention. The approach involves model-to-image registration, which is equivalent to the boundary finding problem considered in Staib and Duncan, 1992. A similar approach to the one described in that paper has therefore been adopted to provide robust model-to-image registration for the method described herein. Note that in the context of the example of registering image of the prostate gland for the purpose of image guidance during a surgical procedure, the model-to-image registration is normally performed in the intra-operative phase (after TRUS images are obtained), so it generally has to be performed in real-time with comparatively little human intervention.

One distinct feature in MR and TRUS images of the prostate gland is the capsule surface (the capsule is the membrane surrounding the prostate gland). In the image registration method disclosed herein, vector representations of this surface, computed independently from the MR-derived model and the 3D TRUS image, are used to align the model with the TRUS image by maximising the similarity between these vectors. In this formulation, the surface of a deformable model, given a set of registration parameters (i.e., rigid-body parameters and shape parameters defined by $\{c_1, c_2, \ldots, c_L\}$), is uniquely defined by the surface normal vector field, u(x), where x is a position vector that defines the 3D co-ordinates of a point in the model space and u is a 3D vector function that defines the surface normal at that particular point. By definition, u is zero at all points not lying on the model surface.

A surface normal vector field, denoted by v, can be estimated for the image using a multi-scale filtering technique based on second-order Gaussian derivatives. In such approaches, the Hessian is computed at each voxel for a particular scale that relates directly to the width of the Gaussian kernel. The relative magnitudes of the eigenvalues of the Hessian can then be used to classify the local image structure, enhancing blob-, tubular- or sheet-like structures, see Frangi et al., 1998.

In one embodiment of the present invention, an extension of the sheet-like enhancement filter proposed by Descoteaux et al. 2007 has been derived to take into account the non-uniform US image intensity characteristics found at boundaries due to the variable angle between a boundary surface and the US beam direction. This effect is responsible for artefacts where, for example, the intensities at a boundary on the lateral sides of the prostate gland (parallel to the US beam direction) are low compared to those on the inferior and superior sides of the gland (perpendicular to the US beam direction).

In the original formulation described in Figueiredo and Gomes, 2006, the response of this type of filter is given by:

$$f_{sheet}(x, y, z) = \exp\left(-\frac{(R_1)^2}{2\alpha^2}\right)\left(1 - \exp\left(-\frac{(R_2)^2}{2\beta^2}\right)\right)\left(1 - \exp\left(-\frac{(R_3)^2}{2\gamma^2}\right)\right), \qquad (2)$$

where the ordered eigenvalues, $\lambda_1, \lambda_2, \lambda_3$ ($|\lambda_1| \leq |\lambda_2| \leq |\lambda_3|$), of the Hessian are computed at point (x,y,z), $R_1 = |\lambda_2/\lambda_3|$, $R_2 = |2|\lambda_3| - |\lambda_2| - |\lambda_1||$ and $R_3 = (\lambda_1^2 + \lambda_2^2 + \lambda_3^2)^{0.5}$.

For the TRUS data collected using the approach described herein, the response of this filter was found to be insensitive to the scalar weighting parameters $\alpha$, $\beta$ and $\gamma$. Therefore, these were set to constant values as suggested in Descoteaux et al. 2007. The width, $\sigma$, of the Gaussian kernel used to compute the Hessian was 1mm in all directions.

If the direction of the US beam is defined by the 3D vector, b, the modified filter response is given by:

$$f^*_{sheet} = (n_3^T b)^2 f_{sheet}, \qquad (3)$$

where $n_3(x,y,z)$ is the normalised eigenvector corresponding to the largest eigenvalue ($\lambda_3$) of the Hessian, which will be approximately co-linear with the surface normal at the surface. The first term in this equation reduces the response to noise when the direction of the US beam is approximately perpendicular to the surface normal.

The surface normal vector field is given by:

$$v(x, y, z) = \begin{cases} n_3, & \text{if } a \leq f^*_{sheet}(x, y, z) \leq b \text{ and } \lambda_3 > 0 \\ 0, & \text{otherwise,} \end{cases} \quad (4)$$

where the scalars a and b specify a window in which the filter response is considered to be significant.

Figure 5:
FIG. 5 illustrates various stages in applying the method of FIG. 4 to the prostate gland in accordance with one embodiment of the invention.

FIG. 5 depicts an example of the surface normal vector field estimated from a 3D TRUS image using the method described above. In particular, FIG. 5 shows the following four images of a prostate gland. From left to right:
a) The first image represents a transverse slice through the original TRUS volume.
b) The second image represents the response of the filter defined above in Equation (3).
c) The third image represents the extracted vector field v (projected onto the slice) given by Equation (4).
d) The fourth image provides a zoomed-in view of a region of interest (shown in the third image) around part of the gland surface.

Returning to FIG. 4, once the second (US) image has been obtained at operation 130, relevant features are extracted from this image at operation 141. In the approach of Staib and Duncan 1992, a feature extracted from the image, such as the surface normal vector field described above, may be considered to be a noise-corrupted version of the surface normal vector field determined from the deformable model. In this formulation, the probability that a particular image voxel, referenced by the index i in the image space $\Omega_{image}$, has co-ordinates $y_i=(x_i, y_i, z_i)$ and an estimated surface normal vector $v_i$ can be expressed as a probability mixture model as follows:

$$f_N(y_i, v_i) = \sum_{j \in \Omega_{model}} h_j f_G(y_i; x_j) f_w(v_i; u_j), \quad (5)$$

where $h_j$ is a scalar mixing parameter and j is an index to a discrete point in the model space $\Omega_{model}$ defined by $x_j=(x_j, y_j, z_j)$. In addition, $f_G$ and $f_W$ are probability density functions that describe Gaussian and bipolar Watson distributions defined as:

$$f_G(y_i;x_j)=((2\pi)^{1.5}|\Sigma_j|^{0.5})^{-1}\exp(-\tfrac{1}{2}(x_j-y_i)^{\tau}\Sigma_j^{-1}(x_j-y_i)), \quad (6)$$

and $$f_W(v_i;u_j)=C(k)\exp(k(u_j^{\tau}v_i)^2)=C(k)\exp(k\cos^2\theta), \quad (7)$$

respectively.

In Equation (6), a special class of anisotropic Gaussian distributions with two parameters is used where the covariance matrix $\Sigma_j$ is expressed as an expansion of a set of orthogonal vectors, $w_d$, in a similar way to spectral decomposition. Hence, $$\Sigma_j = \Sigma_{d=1}^3 \rho_d w_d w_d^{\tau}, \quad (8)$$

where $w_d$ defines the orientations of the ellipsoid (which defines a surface of constant probability density) and $w_1$ is set to $u_j$. The two independent parameters, $\rho_1$ and $\rho_2$ (=$\rho_3$), govern the "capture range" in the surface normal direction and in the tangent plane, respectively. For the experiments described herein, $\rho_1=2\rho_2$.

In Equation (7), k is a scalar concentration parameter which is varied depending on the noise level. In one implementation, k was set to a small value 0.1<k<0.5 in order to weaken the contribution from a strong local match. The normalising constant, C(k), was estimated by recursive integration to satisfy the requirements of a probability density function. The angle $\theta$ is the angle between the model surface normal vector, computed at point j, and the image surface normal vector, computed at voxel i.

Once a set of image features 142 has been extracted from the second image (and as shown for example in the third diagram of FIG. 5), model-to-image registration is performed at operation 143. The registration procedure uses the statistical motion model 226 generated using the method of FIG. 2 (for example). As previously noted, the SMM is usually generated in a preoperative phase.

The registration procedure of operation 143 aims to find the optimal transformation parameters which maximise the joint probability of the noise. Assuming that the noise values at different voxels are independent (see Staib and Duncan, 1992), we arrive at the following log-likelihood objective function:

$$f_{obj} = \log(L(m|I)) = \log \prod_{\Omega_{image}} P(I|m) - \log \prod_{i \in \Omega_{image}} f_N(y_j, v_i|m) \quad (9)$$

$$= \sum_{i \in \Omega_{image}} \log \sum_{j \in \Omega_{model}} h_j f_G(y_i; x_j) f_w(v_i; u_j)$$

The expectation maximisation (EM) algorithm provides an efficient way of maximising a likelihood function in Equation (9), Figueiredo and Gomes, 2006. An EM algorithm was implemented using Matlab (The Mathworks, Inc., Natick, Mass., USA) which iteratively optimises the registration parameters in order to maximise Equation (9).

In effect, the registration procedure searches through the multi-dimensional space defined by the set of parameters of the SMM to find the parameters for which the shape of the deformed geometric model (derived from the MR image) best fits the surface of prostate gland as represented in the TRUS image. Each set of values for the SMM parameters corresponds to a new position and shape of the finite element model. The use of PCA allows the potential deformations of the model to be investigated in a systematic and efficient manner. The output of the registration procedure is the set of parameter values that deforms the model so that the model surface corresponds most closely to the gland surface as observed in the TRUS image.

Once the best fit deformation has been determined, a set of displacements is produced to form a dense displacement field (DDF). These displacements map from the original model, as derived from the MR image, to the deformed model that has been found to fit the TRUS image best. These same displacements can then be applied to the voxels of the original MR image in order to align the MR image with the TRUS image. (Conversely, the opposite displacements could be applied to the TRUS image to align it with the MR image).

The above approach was investigated using data from 7 patients with prostate cancer (all patients gave written consent to participate). T2-weighted MR image volumes of the prostate gland were acquired prior to template-guided transperineal needle biopsy under general anaesthesia. Immediately before needle insertion, 3D TRUS images of the gland were acquired using a B-K ProFocus scanner from B-K Medical Ltd., UK (see www.bkmed.com). A set of parallel transverse B-mode images were captured and stored on the scanner at 2 mm intervals using a mechanical stepping device from Tayman Medical Inc., of MO, USA, to translate the US probe (B-K 8658T, 5-7.5MHz transducer) axially along the rectum.

Each US image was first resampled into a volume with an isotropic voxel dimension of 1 mm. At each voxel, the Hessian was computed in the frequency domain using an implementation based on the fast Fourier transform. A quick and simple procedure was used to initialise the pose of the SMM with respect to the TRUS volume, where two points at the apex and base of the gland were manually identified. Once registered, dense displacement fields were computed across the volume of interest by interpolating the final instance of the SMM with a solid FE mesh using a shape function for tetrahedral elements.

The accuracy of the image registration obtained from the above procedure was investigated by identifying manually in both the MR and TRUS volumes corresponding anatomical landmarks, including cysts, calcifications, the urethra, the puboprostatic ligament, and the junction between the seminal vesicles, the vas deferens and the midline of the gland. The 3D co-ordinates of landmarks defined in the MR image were then propagated into TRUS co-ordinates using the DDF. For each pair of identified and propagated landmarks, a target registration error (TRE) was calculated, defined as the distance between the manually defined and propagated landmark points in the co-ordinate system of the TRUS image. The MR images were also warped using DDF to allow a visual assessment of the registration. Note that although only the gland surface is registered in this scheme, the use of a deformable finite-element model enables the displacement of internal structures to be rapidly computed.

The landmark-based TREs calculated for intra-prostatic landmarks are given in Table 1 below. The root-mean-square (RMS) TRE over all 7 cases (26 landmarks) was 2.66 mm. This figure can be considered as representative of the overall accuracy of the image-to-image registration.

TABLE 1

| | Case No. | | | | | | | |
|---|---|---|---|---|---|---|---|---|
| | 1 | 2 | 3 | 4 | 5 | 6 | 7 | All |
| Number of Landmarks | 5 | 3 | 3 | 4 | 4 | 4 | 3 | 26 |
| TRE (mm RMS) | 1.92 | 3.67 | 3.14 | 1.86 | 1.57 | 3.23 | 3.12 | 2.66 |

Figure 6:
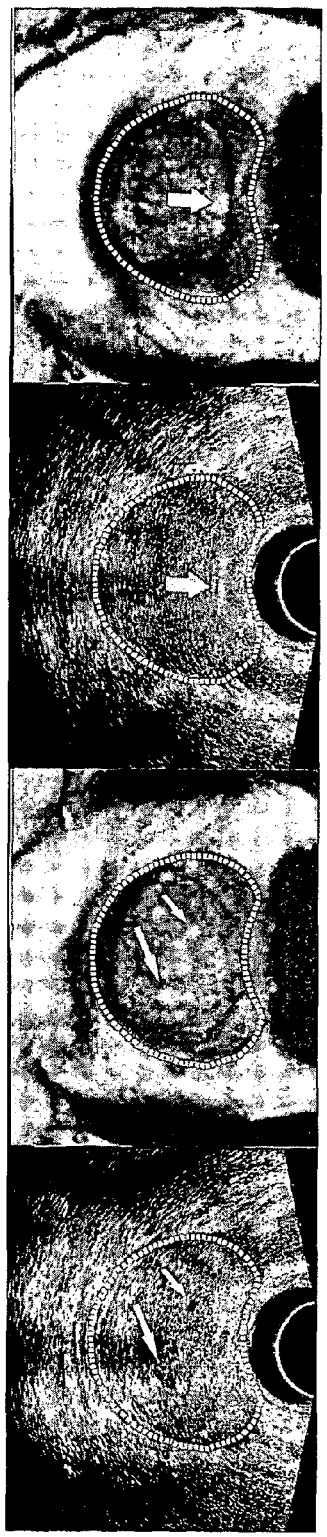
FIG. 6 illustrates the alignment of images of the prostate gland obtained by the method of FIG. 1 in accordance with one embodiment of the invention.

FIG. 6 illustrates the result of warping MR and target TRUS images using the DDF computed from an example registration in accordance with one embodiment of the invention. In particular, FIG. 6 shows transverse image slices ($1^{st}$ and $3^{rd}$ images) through a TRUS volume for Case 1 shown with the corresponding warped MR images ($2^{nd}$ and $4^{th}$ images) following deformable registration. The arrows indicate landmarks which were well-aligned.

In the above approach therefore, two images of the same object are provided as input. One of these images is segmented to produce a geometric model of the object of interest. For instance, the geometric model of an organ may take the form a surface mesh. A 3D vector field is then computed for both the geometric model and remaining image. In the case of a surface mesh, the vector field is the set of local surface normal vectors across that surface. In the case of a tubular structure (such as a blood vessel), the vector field is the set of vectors that describe the local direction along the structure. For the image, a corresponding vector field is computed directly from the image, for example using a second-order Gaussian image filter which is tuned to detect surface-like or tubular structures as appropriate. The model is then registered to the image by aligning the vector fields such that a numerical measure of vector similarity is minimised. During the registration procedure, the vector field derived from the geometric model is deformed in accordance with the constraints specified by an organ motion model (for example, represented by a statistical shape model). Since the spatial transformation between the geometric model and input image from which it was derived is known, the registration transformation between the input images can be calculated using the output of this registration.

The above approach can be used to enable automatic or semi-automatic multimodal image registration even when conventionally "difficult" images, such as US images, are involved. Such a method can be used (for example) to register preoperative MR to intraoperative TRUS images of the prostate gland during needle biopsy and minimally-invasive interventions, such a radio-, brachy-, cryo-, and photodynamic therapies, and high intensity focused US and radiofrequency ablation. In one embodiment, a statistical motion model of the prostate gland is first built using training data provided by biomechanical simulations of the motion of a patient-specific finite element model derived from a (preoperative) MR image. The SMM is then registered to a 3D TRUS image by maximising the likelihood of the shape of an SMM instance given a voxel-intensity-based feature which represents an estimate of the normal vector at the surface of the prostate gland. Using data acquired from 7 patients, the accuracy of registering T2 MR to 3D TRUS images has been evaluated using anatomical landmarks inside the gland. The results from this evaluation indicated an rms target registration error of 2.66 mm. For the application of registering MR and ultrasound images of the prostate gland, the approach described herein has therefore been demonstrated to provide accurate, deformable registration with minimal user interaction.

The model-to-image registration method uses a combined statistical-biomechanical model built from an MR image. The generation of the model involves manual segmentation of the MR image and is computationally intensive (the processing time is typically 30-40 hours with current computing facilities). However, since the model generation is performed between the time of acquisition of MR image and the time of a procedure in which image registration is required for surgical guidance, it does not significantly impact the clinical workflow. In contrast, the model-to-image registration (using the already generated model) can currently be performed within 2 minutes using a desktop PC with a 2.33 GHz Intel® Core™ dual CPU processor and 3 GB of RAM. The approach described herein provides sufficiently high accuracy to be clinically useful for MR-targeted prostate biopsy and interventions.

Although the above description has focussed on automatically registering a deformable 3D model of the prostate gland, derived from a high-resolution MR image, to 3D TRUS images for image-guided needle biopsy and therapy applications, the approach described herein is directly applicable to other image registration problems. The approach is particularly relevant to situations in which the following criteria apply: (a) one image differs significantly enough from another that an intensity-based registration algorithm cannot be applied successfully; (b) automatically extracting salient features from one image is sufficiently difficult that a feature-based registration algorithm is impractical given the time constraints imposed by the application for which the registration is used; and (c) a geometric model of an organ, based on a physical feature represented by one, exists or can be obtained using fully- or semi-automatic segmentation software without significant impact on the workflow of the overall application. Many applications in the field of image-guided surgery meet these criteria.

In summary, the above embodiments are provided by way of example only, and the skilled person will be aware of many potential modifications or variations that remain within the scope of the present invention as defined by the appended claims.

REFERENCES

Ahmed, H. U., et al., "Active Surveillance and Radical Therapy in Prostate Cancer: Can Focal Therapy over the Middle Way?" *World J Urol.*, 26:457-467, (2008).

S. R. Aylward, J. Jomier, S. Weeks, and E. Bullitt, "Registration and Analysis of Vascular Images," *Int. J. Computer Vision*, vol. 55, pp. 123-138, (2003).

Beichel, R., Bischof, H., Leberi, F., and Sonka, M., "Robust active appearance models and their application to medical image analysis", *IEEE Trans. Med. Imag.*, vol. 24, No. 9, pp. 1151-1169, (2005).

Cootes, T. F. and Taylor, C. J., Cooper, D. H. and Graham, J., "Active shape models—their training and application". *Computer Vision and Image Understanding*, vol. 61, pp. 38-59, (1995).

Cootes, T. F., Edwards, G. J., and Taylor, C. J. "Active appearance models," in: Burkhardt, H. and Neumann, B. (Eds.), *Proc. Eur. Conf. Computer Vision*, vol. 2, pp. 484-498, (1998).

Descoteaux, M., et al., "Bone Enhancement Filtering: Application to Sinus Bone Segmentation and Simulation of Pituitary Surgery." Proc. MICCAI 2005, vol. 11, pp. 247-255, (2006).

Figueiredo, A., and Gomes, P., "Performance of the EM Algorithm on the Identification of a Mixture of Watson Distributions Defined on the Hypersphere." Statistical Journal, vol. 4, No. 2, pp. 111-130, (2006).

Frangi, A., et al., "Multiscale Vessel Enhancement Filtering", in W. M. Wells et al. (Eds.), *Medical Image Computing and Computer-Assisted Intervention—MICCAI'98*, LNCS 1496, pp. 130-137, (1998).

Hu, Y., et al., "Modelling Prostate Gland Motion for Image-guided Interventions." Proc. ISBMS08, vol. 5104, pp. 79-88, (2008).

A. P. King, J. M. Blackall, G. P. Penney, and D. J. Hawkes, "Tracking Liver Motion Using 3-D Ultrasound and a Surface Based Statistical Shape Model," *IEEE Workshop on Mathematical Methods in Biomedical Image Analysis*, p 145-152, (2001).

Kirkham A P, et al. "How good is MRI at detecting and characterising cancer within the prostate?" Eur Urol., 50:1163-1174, (2006).

McInerney, T. and Terzopoulos, D., "Deformable Models in Medical Image Analysis: A Survey". *Medical Image Analysis*, Vol 1, pp. 91-108, (1996).

Mohamed, A., et al: "A Combined Statistical and Biomechanical Model for Estimation of Intra-Operative Prostate Deformation." Proc. MICCAI, vol. 2489, pp. 452-460, (2002).

D. Morgan, H. U. Ahmed, D. Pendse, M. Emberton, D. J. Hawkes and D. C. Barratt "Registration of Preoperative MR to Intraoperative Ultrasound Images for Guiding Minimally Invasive Prostate Interventions," in *Proc. Medical Image Analysis and Understanding* 2007 Conference, pp. 181-185, (2007).

G. P. Penney, J. M. Blackall, M. S. Hamady, T. Sabharwal, and A. Adam, "Registration of freehand 3D ultrasound and magnetic resonance liver images," *Med Image Anal*, vol. 8, pp. 81-91, (2004).

G. P. Penney, D. C. Barratt, C. S. K. Chan, et al., "Cadaver validation of intensity-based ultrasound to CT registration," *Med Image Anal*, vol. 10, pp. 385-395, (2006).

A. Roche, X. Pennec, and G. Malandain, "Rigid registration of 3-D ultrasound with MR images: a new approach combining intensity and gradient information," *IEEE Trans Med Imaging*, vol. 20, pp. 1038-1049, (2001).

W. Shao, R. Wu, K. V. Ling, C. H. Thng, H. S. S. Ho, and C. W. S. &. N. W. S. Cheng, "Evaluation on similarity measures of a surface-to-image registration technique for ultrasound images," in Medical Image Computing and Computer-Assisted Intervention—MICCAI 2006, Springer, LNCS 4191, pp. 742-749, (2006).

Staib L. H. and Duncan, J. S., "Boundary Finding with Parametrically Deformable Models." IEEE Trans. PAMI, vol. 14, pp. 1061-1075, (1992).

W. Wein, S. Brunke, A. Khamene, and M. R. Callstrom, "Automatic CT-ultrasound registration for diagnostic imaging and image-guided intervention," *Med Image Anal*, vol. 12, pp. 577-585, (2008).

Wu, R., et al., "Registration of Organ Surface with Intra-Operative Ultrasound Image Using Genetic Algorithm." Proc. MICCAI, vol. 2878, pp. 383-390, (2003).

Xu S., et al., "Real-time MRI-TRUS fusion for guidance of targeted prostate biopsies." Comput Aided Surg., vol. 13(5), pp. 255-264, (2008).

W. Zhang, J. A. Noble, and J. M. Brady, "Adaptive non-rigid registration of real time 3D ultrasound to cardiovascular MR images," *Inf. Process Med. Imaging*, vol. 20, pp. 50-61, (2007).

The invention claimed is:

1. A method for registering two medical images, said method comprising:

obtaining a first medical image including a patient-specific representation of a biological organ of an individual subject or a representation of a biological organ for a population;

identifying the surface of said organ in said first medical image;

using said surface to obtain a geometric model that represents the three-dimensional shape of said organ for a subject or the representative shape of said organ for a population;

using said geometric model to obtain a motion model which can be used to predict the physical motion and deformation of said organ;

obtaining a second medical image including a representation of said organ of said subject or another subject;

determining an alignment between surface normal vectors of said geometric model, which represent a first vector field, and estimated surface normal vectors of the organ surface derived by filtering said second medical image, which represent a second vector field, wherein determining said alignment includes applying a mathematical transformation to said geometric model to maximise a measure of orientational alignment between the first and second vector fields, and wherein the spatial position, orientation and shape of said geometric model and of said first vector field are changed in accordance with said motion model to achieve said alignment;

and registering the first and second medical images with one another based on said determined alignment.

2. The method of claim 1, wherein the first medical image is a magnetic resonance (MR) image or an X-ray computed tomography (CT) image.

3. The method of claim 1, wherein the first medical image is an ultrasound image or an atlas image.

4. The method of claim 1, wherein the second medical image is an ultrasound image.

5. The method of claim 1, wherein said anatomical feature comprises the prostate gland.

6. The method of claim 1, wherein obtaining said first image, said geometric model and said motion model is performed prior to a time-point in a surgical procedure when determining the alignment between said first image and said second image of a subject undergoing such a procedure is required for the purposes of surgical navigation.

7. The method of claim 6, wherein said geometric model is included as part of a plan for a surgical treatment or a diagnostic test.

8. The method of claim 1, wherein said geometric model is derived using statistical shape modelling techniques.

9. The method of claim 1, wherein said geometric model is a finite element mesh that describes the surface of said organ.

10. The method of claim 9, wherein said finite element mesh is generated from a spherical harmonic representation of said identified surface.

11. The method of claim 1, wherein constructing said motion model further includes using solid modelling tools to generate a volumetric finite element model from said geometric model.

12. The method of claim 11, wherein constructing said motion model further includes using finite element analysis to determine the displacement of the mesh nodes (vertices) of said finite element model, and assigning physical material properties to the model in accordance with the physiological ranges of such properties.

13. The method of claim 12, further comprising the use of finite element analysis to perform a set of simulations, said simulations representing various physically plausible deformations of said organ.

14. The method of claim 13, further comprising performing statistical analysis of the displacements of said finite element mesh nodes (vertices) calculated by said simulations to generate the motion model for the organ.

15. The method of claim 1, wherein determining the alignment includes an initialisation step of identifying one or more points corresponding to anatomical landmarks in the second medical image and matching them to said geometric model in order to approximately orientate the geometric model with respect to the second medical image.

16. The method of claim 1, wherein said first vector field comprises a three-dimensional vector field in which each vector has a location corresponding to a point on the surface of said geometric model and an orientation normal to said surface of said geometric model.

17. The method of claim 1, wherein said filtering of said second medical image is based on an eigenanalysis of the second order Gaussian derivatives of the voxel (3D pixel) intensity values of said image to determine said second vector field of surface normal vectors.

18. The method of claim 1, wherein said second vector field, derived by filtering said second medical image, is considered to be a noise-corrupted version of the first vector field.

19. The method of claim 18, wherein said alignment is determined on the basis of maximising the joint probability of the noise.

20. The method of claim 1, wherein said alignment is determined using a vector similarity measure that quantifies the orientational alignment between said first and second vector fields by calculating a function of the inner product of estimated surface normal vectors in said second vector field and surface normal vectors in said first vector field after being transformed into a local co-ordinate system of said second image.

21. The method of claim 20, wherein said vector similarity measure accounts for the presence of artefacts dependent on ultrasound beam direction when said image is an ultrasound image.

22. The method of claim 1, wherein determining said alignment includes re-positioning and deforming said geometric model such that the final shape and position of the deformed model provides a best fit to the organ surface in the co-ordinate system of said second medical image.

23. The method of claim 22, wherein registering the first and second medical images with one another based on said determined alignment includes calculating a dense displacement field comprising displacements that map from said geometric model to said deformed geometric model.

24. A non-transitory computer readable storage medium storing computer program instructions for execution by a processor in an apparatus for causing the apparatus to implement a method for registering two medical images comprising:

obtaining a first medical image including a patient-specific representation of a biological organ of an individual subject or a representation of a biological organ for a population;

identifying the surface of said organ in said first medical image;

using said surface to obtain a geometric model that represents the three-dimensional shape of said organ for a subject or the representative shape of said organ for a population;

using said geometric model to obtain a motion model which can be used to predict the physical motion and deformation of said organ;

obtaining a second medical image including a representation of said organ of said subject or another subject;

determining an alignment between surface normal vectors of said geometric model, which represent a first vector field, and estimated surface normal vectors of the organ surface derived by filtering said second medical image, which represent a second vector field, wherein determining said alignment includes applying a mathematical transformation to said geometric model to maximise a measure of orientational alignment between the first and second vector fields, and wherein the spatial position, orientation and shape of said geometric model and of said first vector field are changed in accordance with said motion model to achieve said alignment;

and registering the first and second medical images with one another based on said determined alignment.

25. Apparatus for registering two medical images, comprising:

an image processing system for identifying an organ surface in a first medical image that includes a representation of the said organ;

a modelling system for using the identified surface to construct a 3D geometric model of said organ surface;

a modelling system for constructing said organ motion model from said 3-D geometric model;

an image processing system for calculating first and second surface normal vector fields from said geometric model and from said second medical image respectively;

a numerical optimisation system for determining an alignment between said first vector field and said second vector field, wherein determining said alignment includes applying a mathematical transformation to said geometric model to maximise a measure of orientational alignment between the first and second vector fields, and wherein the spatial position, orientation and shape of said geometric model and of said first vector field are changed in accordance with said motion model to achieve said alignment, thereby accommodating deformation of the geometric model in accordance with said motion model; and an image registration system for registering the first and second medical images with one another based on said determined alignment.

26. The apparatus of claim 25, further comprising an image fusion system for visualising the first and second medical images together based on said determined alignment.

* * * * *